United States Patent [19]

Sakashita et al.

[11] Patent Number: 5,151,491
[45] Date of Patent: Sep. 29, 1992

[54] CATALYTIC MELT CONDENSATION PREPARATION OF POLYCARBONATE

[75] Inventors: Takeshi Sakashita; Tomoaki Shimoda, both of Yamaguchi, Japan

[73] Assignee: GE Plastics Japan, Ltd., Tokyo, Japan

[21] Appl. No.: 410,464

[22] Filed: Sep. 21, 1989

[30] Foreign Application Priority Data

Sep. 22, 1988 [JP] Japan .................. 63-238428
Sep. 22, 1988 [JP] Japan .................. 63-238429

[51] Int. Cl.$^5$ .............................. C08G 64/20
[52] U.S. Cl. ................... 528/199; 528/196; 528/198; 528/200
[58] Field of Search ............. 528/199, 198, 200, 196

[56] References Cited

U.S. PATENT DOCUMENTS

| | | |
|---|---|---|
| Re. 27,682 | 6/1973 | Schnell et al. .................. 260/47 |
| Re. 31,262 | 5/1983 | Brunelle . |
| 3,544,514 | 12/1970 | Schnell et al. .................. 260/47 |
| 4,267,303 | 5/1981 | Rönig et al. .................. 528/199 |
| 4,330,664 | 5/1982 | Brunelle . |
| 4,590,257 | 5/1986 | Brunelle .................. 528/176 |
| 4,699,971 | 10/1987 | Mark et al. .................. 528/198 |
| 4,775,739 | 10/1988 | Hasuo et al. .................. 528/198 |
| 4,788,276 | 11/1988 | Mark et al. .................. 528/179 |
| 4,839,458 | 6/1989 | Koga et al. . |
| 4,880,896 | 11/1989 | Otsubo et al. . |

FOREIGN PATENT DOCUMENTS

| | | |
|---|---|---|
| 0130512 | 5/1984 | European Pat. Off. . |
| 2439552 | 8/1974 | Fed. Rep. of Germany . |
| 47-14742 | 5/1972 | Japan .................. 528/199 |
| 012338 | 9/1988 | Japan . |
| 1097058 | 12/1967 | United Kingdom . |

Primary Examiner—Harold D. Anderson
Attorney, Agent, or Firm—Sherman and Shalloway

[57] ABSTRACT

Disclosed herein are processes for the production of polycarbonates by melt polycondensation of an aromatic dihydroxy compound and a carbonic acid diester or a diphenyl carbonate compound wherein said polycondensation is carried out in the presence of from 0.05 to 15 mol %, based on 1 mole of the aromatic dihydroxy compound, of a phenol having from 10 to 40 carbon atoms, a carbonic acid diester having from 17 to 50 carbon atoms, or a carbonic acid diester having from 13 to 16 carbon atoms, using a catalyst comprising (a) a nitrogen containing basic compound, (b) from $10^{-8}$ to $10^{-3}$ mole, based on 1 mole of the aromatic dihydroxy compound, of an alkali metal or alkaline earth metal compound, and (c) boric acid or boric ester. Also disclosed is a polycarbonate in which from 5 to 30% of its terminal groups are hydroxy groups and it has a sodium content of not more than 1 ppm and a chlorine content of not more than 20 ppm.

21 Claims, No Drawings

CATALYTIC MELT CONDENSATION PREPARATION OF POLYCARBONATE

FIELD OF THE INVENTION

The present invention relates to polycarbonates and processes for the production thereof. More particularly, it relates to polycarbonates having excellent color tone, heat resistance and water resistance and processes for the production thereof.

BACKGROUND OF THE INVENTION

Because of their excellent mechanical characteristics, such as impact strength, and because of their excellent heat resistance and transparency, polycarbonates are widely used for various purposes. Known as processes for the production of the polycarbonates are processes which involve a direct reaction of aromatic dihydroxy compounds such as bisphenols with phosgene (interface processes), and processes in which aromatic dihydroxy compounds such as bisphenols and carbonic acid diesters such as diphenyl carbonate are allowed in molten state to undergo ester interchange reaction (polycondensation reaction).

In processes for the production of polycarbonates by ester interchange of aromatic dihydroxy compounds with carbonic acid diesters, the reactants are normally heated at a temperature of from 250° to 330° C. under reduced pressure and allowed in molten state to undergo the ester interchange in the presence of catalysts such as organic salts, inorganic salts, oxides, hydroxides, hydrides and alcoholates of metals. These processes are advantageous over the above-mentioned interface processes in that polycarbonates are produced in relatively low costs. These processes involving the reaction of the aromatic dihydroxy compounds with the carbonic acid diesters in molten state, however, have posed a problem in that the polycarbonates produced are generally poor in color tone, heat resistance or water resistance.

With a view of solving the problem we conducted extensive research and eventually accomplished the present invention on the basis of our finding that excellent heat resistance and water resistance can be provided by reducing terminal hydroxy groups of polycarbonates being formed by end capping them with specific compounds.

OBJECT OF THE INVENTION

The invention is intended to solve the problem associated with the prior art as mentioned above, and an object of the invention is to provide processes for the production of polycarbonates capable of producing polycarbonates having excellent color tone, heat resistance and water resistance.

SUMMARY OF THE INVENTION

A first process for the production of polycarbonates according to the invention comprises melt polycondensation of an aromatic dihydroxy compound and a carbonic acid diester, characterized by carrying out said polycondensation in the presence of from 0.05 to 15 mol %, based on 1 mole of the aromatic dihydroxy compound, of an phenol having from 10 to 40 carbon atoms by using a catalyst comprising
(a) a nitrogen containing basic compound, and
(b) from $10^{-8}$ to $10^{-3}$ mole, based on 1 mole of the aromatic dihydroxy compound, of an alkali metal or alkaline earth metal compound, and optionally
(c) boric acid or boric ester,
thereby producing a polycarbonate having hydroxy terminal groups not exceeding 30% of the whole terminal groups thereof and an intrinsic viscosity $[\eta]$ of from 0.3 to 1.0 dl/g, as measured in methylene chloride at a temperature of 20° C.

A second process for the production of polycarbonates according to the invention comprises melt polycondensation of an aromatic dihydroxy compound and a diphenyl carbonate compound, characterized by carrying out said polycondensation in the presence of from 0.05 to 15 mol %, based on 1 mole of the aromatic dihydroxy compound, of a carbonic acid diester having from 17 to 50 carbon atoms by using a catalyst comprising
(a) a nitrogen containing basic compound,
(b) from $10^{-8}$ to $10^{-3}$ mole, based on 1 mole of the aromatic dihydroxy compound, of an alkali metal or alkaline earth metal compound, and optionally
(c) boric acid or boric ester,
thereby producing a polycarbonate having hydroxy terminal groups not exceeding 30% of the whole terminal groups thereof and an intrinsic viscosity $[\eta]$ of from 0.3 to 1.0 dl/g, as measured in methylene chloride at a temperature of 20° C.

A third process for the production of polycarbonates according to the invention comprises melt polycondensation of an aromatic dihydroxy compound and a diphenyl carbonate compound, characterized by carrying out said polycondensation in the presence of from 0.05 to 15 mol %, based on 1 mole of the aromatic dihydroxy compound, of a carbonic acid diester having from 13 to 16 carbon atoms by using a catalyst comprising
(a) a nitrogen containing basic compound,
(b) from $10^{-8}$ to $10^{-3}$ mole, based on 1 mole of the aromatic dihydroxy compound, of an alkali metal or alkaline earth metal compound, and optionally
(c) boric acid or boric ester,
thereby producing a polycarbonate having hydroxy terminal groups not exceeding 30% of the whole terminal groups thereof and an intrinsic viscosity $[\eta]$ of from 0.3 to 1.0 dl/g, as measured in methylene chloride at a temperature of 20° C.

A polycarbonate according to the invention is characterized in that from 10 to 30% of its terminal groups are hydroxy groups.

Further a polycarbonate according to the invention is characterized in that from not more than 30% of its terminal groups are hydroxy groups and that it has a sodium content of not more than 1 ppm and a chlorine content of not more than 20 ppm.

DETAILED DESCRIPTION OF THE INVENTION

The processes for preparing polycarbonates according to the invention will be illustrated in detail.

In the first process according to present invention, the polycarbonates are prepared by melt polycondensation of an aromatic dihydroxy compound and a carbonic diester in the presence of a phenol having from 10 to 40 carbon atoms.

The aromatic dihydroxy compounds used herein are those which are represented by the following general formula [I]

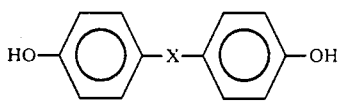

wherein X is

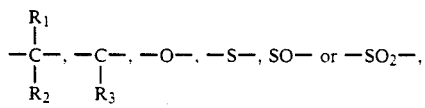

$R_1$ and $R_2$, each represents a hydrogen atom or a monovalent hydrocarbon group, $R_3$ is a divalent hydrocarbon group, and the aromatic nuclei may be substituted by a monovalent hydrocarbon group or groups.

Useful aromatic dihydroxy compounds as illustrated above include in the concrete bis(hydroxyaryl)alkanes such as bis(4-hydroxyphenyl) methane, 1,1-bis(4-hydroxyphenyl)ethane, 2,2-bis(4-hydroxyphenyl)propane, 2,2-bis(4-hydroxyphenyl) butane, 2,2-bis(4-hydroxyphenyl)octane, bis(4-hydroxyphenyl)phenylmethane, 2,2-bis(4-hydroxy-1-methylphenyl)propane, 1,1-bis(4-hydroxy-t-butylphenyl)propane, and 2,2-bis(4-hydroxy-3-bromophenyl)propane; bis(hydroxyaryl)cycloalkanes such as 1,1-(4-hydroxyphenyl)cyclopentane and 1,1-bis(4-hydroxyphenyl)cyclohexane; dihydroxyaryl ethers such as 4,4'-dihydroxydiphenyl ether and 4,4'-dihydroxy-3,3'-dimethylphenyl ether; dihydroxydiaryl sulfides such as 4,4'-dihydroxydiphenyl sulfide; and 4,4'-dihydroxy-3,3'-dimethyldiphenyl sulfide; dihydroxydiaryl sulfoxides such as 4,4'-dihydroxydiphenyl sulfoxide and 4,4'-dihydroxy-3,3'-dimethyldiphenyl sulfoxide; and dihydroxydiaryl sulfones such as 4,4'-dihydroxydiphenyl sulfone and 4,4'-dihydroxy-3,3'-dimethyldiphenyl sulfone.

Of the compounds as exemplified above, particularly preferred is 2,2-bis(4-hydroxyphenyl)propane.

Useful carbonic diesters which can be used herein include, in the concrete, diphenyl carbonate, ditolyl carbonate, bis(chlorophenyl) carbonate, m-cresyl carbonate, dinaphthyl carbonate, bis(diphenyl)carbonate, diethyl carbonate, dimethyl carbonate, dibutyl carbonate and dicyclohexyl carbonate.

Of the diesters as exemplified above, particularly preferred is diphenyl carbonate.

The carbonic diester used herein may contain a minor amount, e.g., up to 50 mol %, preferably up to 30 mol %, of a dicarboxylic acid or its ester.

Such dicarboxylic acids and esters thereof are not particularly restricted by their numbers of carbon atoms, and examples of them include, for example, terephthalic acid, isophthalic acid, diphenyl terephthalate and diphenyl isophthalate. When such a dicarboxylic acid or its ester is conjointly used, polyesterpolycarbonates are produced instead of the polycarbonates. The invention contemplates the production of such polyesterpolycarbonates.

In preparing polycarbonates by carrying out the first process according to the present invention, it is desirable that the above-mentioned carbonic diester is used in an amount of 1.01 to 1.30 moles, preferably 1.02 to 1.20 moles based on 1 mole of the aforementioned aromatic dihydroxy compound.

In the first process for the production of polycarbonates according to the invention the melt polycondensation of the aromatic dihydroxy compound and the carbonic acid diester is carried out in the presence of from 0.05 to 15 mol %, preferably from 0.5 to 7 mol %, and more preferably from 1 to 5 mol %, based on 1 mole of the aromatic dihydroxy compound, of an phenol having from 10 to 40, preferably from 15 to 40 carbon atoms.

Suitable phenols which can be used in the first process according to the invention are monohydric phenols including, for example, o-n-butylphenol, m-n-butylphenol, p-n-butylphenol, o-isobutylphenol, m-isobutylphenol, p-isobutylphenol, o-tert.-butylphenol, m-tert.-butylphenol, p-tert.-butylphenol, o-n-pentylphenol, m-n-pentylphenol, p-n-pentylphenol, o-n-hexylphenol, m-n-hexylphenol, p-n-hexylphenol, o-cyclohexylphenol, m-cyclohexylphenol, p-cyclohexylphenol, o-phenylphenol, m-phenylphenol, p-phenylphenol, o-n-nonylphenol, m-n-nonylphenol, p-n-nonylphenol, o-cumylphenol, m-cumylphenol, p-cumylphenol, o-naphthylphenol, m-naphthylphenol, p-naphthylphenol, 2,6-di-tert.-butylphenol, 2,5-di-tert.-butylphenol, 2,4-di-tert.-butylphenol, 3,5-di-tert.-butylphenol, 2,5-dicumylphenol, 3,5-dicumylphenol, chromanyl compounds such as

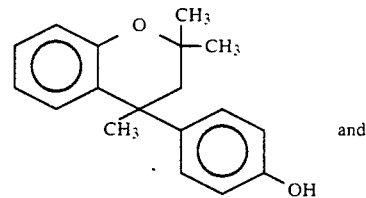

and

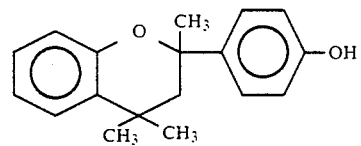

and monohydric phenols of the formulas:

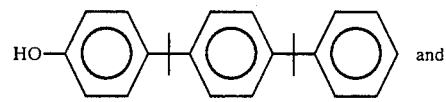

and

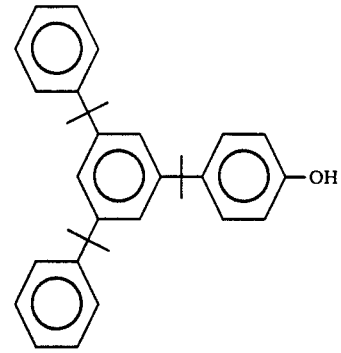

Of the phenols illustrated above, binucleus phenols having two aromatic rings such as p-cumylphenol and p-phenylphenol are particularly preferred.

In the first process for the production of polycarbonates according to the invention, it is essential to carry out the melt polycondensation of the aromatic dihydroxy compound and the carbonic acid diester in the presence of 0.05-15 mol %, based on the aromatic dihydroxy compound, of the phenol mentioned above. By doing so, intended sequestering of hydroxy terminal groups of the polycarbonate being formed proceeds sufficiently, leading to a product of satisfactory heat and water resistances, and the rate of melt polycondensation markedly increases.

All of the amount of the phenol to be used may be added to the reaction system prior to the reaction, or a part of the amount of the phenol to be used may be added to the reaction system prior to the reaction with the remaining amount added during the reaction. In some cases, the reaction of the aromatic dihydroxy compound with the carbonic acid diester may be started in the absence of the phenol, and after the reaction has proceeded to some extent all of the amount of the phenol may be added to the reaction system.

The second process for the production of polycarbonates in accordance with the invention will now be described in detail.

In the second process for the production of polycarbonates according to the invention the melt polycondensation of the aromatic dihydroxy compound and the diphenyl carbonate compound is carried out in the presence of a carbonic acid diester having from 17 to 50 carbon atoms.

As the aromatic dihydroxy compound those described hereinbefore with respect to the first process can be used.

As the diphenyl carbonate compound there can normally be used carbonic acid diaromatic esters having from 13 to 16 carbon atoms. Examples of such compounds include, for example, diphenyl carbonate, triphenyl carbonate, ditolyl carbonate, bis(chlorophenyl) carbonate and m-cresyl carbonate. Of these, diphenyl carbonate is particularly preferred.

The diphenyl carbonate compound used herein may contain a minor amount, e.g., up to 50 mol %, preferably up to 30 mol %, of a dicarboxylic acid or its ester. Such dicarboxylic acids and esters thereof are not particularly restricted by their numbers of carbon atoms, and examples of them include, for example, terephthalic acid, isophthalic acid, diphenyl terephthalte and diphenyl isophthalate. When such a dicarboxylic acid or its ester is conjointly used, polyesterpolycarbonates are produced instead of the polycarbonates. The invention contemplates the production of such polyesterpolycarbonates.

In the second process according to the invention, it is desirable that the above-mentioned diphenyl carbonate compound is used in an amount of from 1.01 to 1.30 moles, preferably from 1.02 to 1.20 moles per mole of the above-mentioned aromatic dihydroxy compound.

In the second process according to the invention, the aromatic dihydroxy compound is melt polycondensed with the diphenyl carbonate compound in the presence of a $C_{17}$-$C_{50}$ carbonic acid diester, which may be represented by the formula:

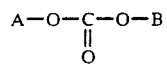

wherein A is an organic group having from 6 to 25 carbon atoms, and B is an organic group having from 10 to 25 carbon atoms with the proviso that the total number of carbon atoms in the molecule does not exceed 50.

More particularly, suitable $C_{17}$-$C_{50}$ carbonic acid diesters which can be used herein may be represented by the following formulas.

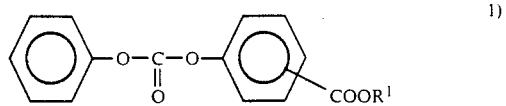

wherein $R^1$ is a hydrocarbon group having from 3 to 36 carbon atoms.

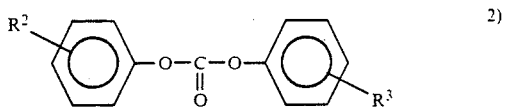

wherein $R^2$ is a hydrocarbon group having from 1 to 19 carbon atoms, and $R^3$ is a hydrocarbon group having from 3 to 19 carbon atoms with the proviso that the total number of carbon atoms in the molecule does not exceed 50.

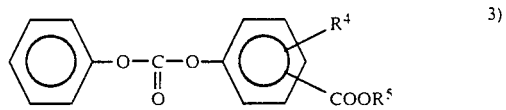

wherein $R^4$ is a hydrocarbon group having from 1 to 30 carbon atoms, and $R^5$ is a hydrocarbon group having from 1 to 20 carbon atoms with the proviso that the total number of carbon atoms in the molecule is within the range between 17 and 50.

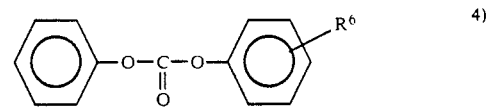

wherein $R^6$ is a hydrocarbon group having from 4 to 37 carbon atoms.

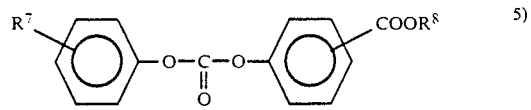

wherein $R^7$ is a hydrocarbon group having from 1 to 30 carbon atoms, and $R^8$ is a hydrocarbon group having from 2 to 20 carbon atoms with the proviso that the total number of carbon atoms in the molecule does not exceed 50.

Examples of preferred $C_{17}$-$C_{50}$ carbonic acid diesters which can be used in the second process according to the invention include, for example, carbobutoxyphenyl phenyl carbonate, butylphenyl methylphenyl carbonate, butylphenyl ethylphenyl carbonate, di-butoxyphenyl carbonate, biphenyl phenyl carbonate, dibiphenyl carbonate, cumylphenyl phenyl carbonate, di-cumylphenyl carbonate, naphthylphenyl phenyl carbonate, di-naphthylphenyl carbonate, carbopropoxyphenyl phenyl carbonate, carboheptoxyphenyl phenyl carbonate, carbomethoxy-tert.-butylphenyl phenyl carbonate, carbopropoxyphenyl methylphenyl carbonate, chromanyl phenyl carbonate, dichromanyl carbonate.

In the second process for the production of polycarbonates according to the invention, it is essential to carry out the melt polycondensation of the aromatic dihydroxy compound and the diphenyl carbonate compound in the presence of 0.05–15 mol %, based on the aromatic dihydroxy compound, of the $C_{17}$–$C_{50}$ carbonic acid diester mentioned above. By doing so, intended sequestering of hydroxy terminal groups of the polycarbonate being formed proceeds sufficiently, leading to a product of satisfactory heat and water resistances, and the rate of melt polycondensation markedly increases.

All of the amount of the $C_{17}$–$C_{50}$ carbonic acid diester to be used may be added to the reaction system prior to the reaction, or a part of the amount of the $C_{17}$–$C_{50}$ carbonic acid diester to be used may be added to the reaction system prior to the reaction with the remaining amount added during the reaction. In some cases, the reaction of the aromatic dihydroxy compound with the diphenyl carbonate compound may be started in the absence of the $C_{17}$–$C_{50}$ carbonic acid diester, and after the reaction has proceeded to some extent all of the amount of the $C_{17}$–$C_{50}$ carbonic acid diester may be added to the reaction system.

The third process for the production of polycarbonates in accordance with the invention will now be described in detail.

In the third process for the production of polycarbonates according to the invention the melt polycondensation of the aromatic dihydroxy compound and the diphenyl carbonate compound is carried out in the presence of a carbonic acid diester having from 13 to 16 carbon atoms.

As the aromatic dihydroxy compound those described hereinbefore with respect to the first process can be used.

As the diphenyl carbonate compound those described hereinbefore with respect to the second process can be used.

In the third process according to the invention, it is desirable that the above-mentioned diphenyl carbonate compound is used in an amount of from 1.01 to 1.30 moles, preferably from 1.02 to 1.20 moles per mole of the above-mentioned aromatic dihydroxy compound.

Examples of $C_{13}$–$C_{16}$ carbonic acid diesters which can be used in the third process according to the invention as a sequestering agent include, for example, diphenyl carbonate, phenyl tolyl carbonate and ditolyl carbonate. Thus, cases wherein the sequestering agent is the same as the diphenyl carbonate reactant are contemplated in the third process according to the invention.

By carrying out the melt polycondensation of the aromatic dihydroxy compound and the diphenyl carbonate compound in the presence of 0.05–15 mol %, based on the aromatic dihydroxy compound, of the $C_{13}$–$C_{16}$ carbonic acid diester which may be the same as or different from the diphenyl carbonate compound, intended sequestering of hydroxy terminal groups of the polycarbonate being formed proceeds sufficiently, leading to a product of satisfactory heat and water resistances.

All of the amount of the $C_{13}$–$C_{16}$ carbonic acid diester to be used may be added to the reaction system prior to the reaction, or a part of the amount of the $C_{13}$–$C_{16}$ carbonic acid diester to be used may be added to the reaction system prior to the reaction with the remaining amount added during the reaction. In some cases, the reaction of the aromatic dihydroxy compound with the diphenyl carbonate compound may be started in the absence of the $C_{13}$–$C_{16}$ carbonic acid diester, and after the reaction has proceeded to some extent all of the amount of the $C_{13}$–$C_{16}$ carbonic acid diester may be added to the reaction system.

In the first, second and third processes according to the invention, a combined content of chlorine contained in the starting materials should preferably be not more than 20 ppm, and more preferably not more than 10 ppm.

The term "chlorine content" means chlorine which is present in the form of salts such as sodium chloride and potassium chloride, and which is present in the form of organic compounds such as phenylchloroformate and methylene chloride. The chlorine content can be determined by an analysis such as ion chromatography.

If the combined content of the chlorine contained in the starting materials is not more than 20 ppm, color tone of the produced polycarbonate desirably tends to become excellent.

The combined content of chlorine contained in the starting materials can be easily reduced below 20 ppm by washing with hot water having a pH of from 6.0 to 9.0, preferably from 7.0 to 8.5, and more preferably from 7.0 to 8.0, and kept at a temperature of from 78° to 105° C., preferably from 80° to 100° C., and more preferably from 80° to 90° C.

Examples of the aqueous weak alkaline solution which can used herein include, for example, those of sodium hydroxide, potassium hydroxide, lithium hydroxide, sodium carbonate, potassium carbonate, ammonium hydroxide, sodium hydrogencarbonate, potassium hydrogencarbonate and tetramethylammonium hydroxide. Of these, aqueous solutions of sodium hydrogencarbonate, sodium carbonate, potassium hydrogencarbonate and potassium carbonate are preferred.

The carbonic acid diester or diphenyl carbonate and the diphenyl carbonate compound so washed with a hot weakly alkaline aqueous solution is used in the melt polycondensation either directly or preferably after having been distilled.

Further, in the present invention, it is also advantageous to use the starting materials having the combined content of sodium ion reduced to preferably not more than 1.0 ppm, and more preferably not more than 0.5 ppm. By doing so, polycarbonates of further improved color tone can be prepared.

The sodium ion content in each of the starting materials may be determined by atomic-absorption spectroscopy or induced coupling plasma emission spectroscopy.

The content of sodium ion in each starting material can be reduced by purification methods such as distillation or recrystallization. In particular, the sodium ion content in the aromatic dihydroxy compound can be reduced by a method comprising forming an adduct of the aromatic dihydroxy compound with a monohydric phenol, separating the adduct and distilling off the monohydric phenol from the adduct.

In the process for the production of polycarbonates according to the invention by melt polycondensation of an aromatic dihydroxy compound and a carbonic acid diester or by melt polycondensation of an aromatic dihydroxy compound and a diphenyl carbonate, the process for the production of polycarbonates is carried out by using a catalyst comprising:

(a) a nitrogen containing basic compound, and
(b) an alkali metal or alkaline earth metal compound.

Useful nitrogen containing basic compound as component (a) of the catalyst includes, in the concrete, tetraalkyl-, aryl- or alkarylammonium hydroxides such as tetramethylammonium hydroxide (Me$_4$NOH), tetraethylammonium hydroxide (Et$_4$NOH), tetrabutylammonium hydroxide (Bu$_4$NOH) and trimethylbenzylammonium hydroxide

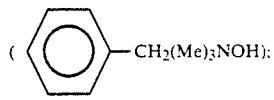

tertiary amines such as trimethylamine, triethylamine, dimethylbenzylamine and triphenylamine; secondary amines represented by R$_2$NH (in the formula, R is alkyl such as methyl or ethyl, or aryl such as phenyl or toluyl); primary amines represented by RNH$_2$ (in the formula, R is as defined above); or basic salts such as ammonia, tetramethylammonium borohydride (Me$_4$NBH$_4$), tetrabutylammonium borohydride (Bu$_4$NBH$_4$), tetrabutylammonium tetraphenyl borate (Bu$_4$NBPh$_4$) and tetramethylammonium tetraphenyl borate (Me$_4$NBPh$_4$).

Of the nitrogen-containing basic compounds as exemplified above, particularly preferred are tetraalkylammonium hydroxides.

Useful alkali metal compound as component (b) of the catalyst includes, in the concrete, sodium hydroxide, potassium hydroxide, lithium hydroxide, sodium hydrogencarbonate, potassium hydrogencarbonate, lithium hydrogencarbonate, sodium carbonate, potassium carbonate, lithium carbonate, sodium acetate, potassium acetate, lithium acetate, sodium stearate, potassium stearate, lithium stearate, sodium borohydride, lithium borohydride, sodium borophenylate sodium benzoate, potassium benzoate, lithium benzoate, disodium hydrogenphosphate, dipotassium hydrogenphosphate, dilithium hydrogenphosphate, disodium salt of BPA, dipotassium salt of BPA, dilithium salt of BPA, sodium phenylate, potassium phenylate, lithium phenylate.

Furthermore, useful alkaline earth metal compound as component (b) of the catalyst includes in the concrete calcium hydroxide, barium hydroxide, magnesium hydroxide, strontium hydroxide, calcium hydrogencarbonate, barium hydrogencarbonate, magnesium hydrogencarbonate, strontium hydrogencarbonate, calcium carbonate, barium carbonate, magnesium carbonate, strontium carbonate, calcium acetate, barium acetate, magnesium acetate, strontium acetate, calcium stearate, barium stearate, magnesium stearate and strontium stearate.

The amount of the nitrogen containing basic compound (a) is from $10^{-6}$ to $10^{-1}$ mole, preferably from $10^{-5}$ to $10^{-2}$ mole, per mole of the aromatic dihydroxy compound. The amount of the alkali metal or alkaline earth metal compound (b) is from $10^{-8}$ to $10^{-3}$ mole, preferably from $10^{-7}$ to $10^{-4}$ mole, more preferably from $10^{-7}$ to $10^{-5}$ mole, per mole of the aromatic dihydroxy compound.

The use of the nitrogen containing basic compound (a) in amount of $10^{-6}$–$10^{-1}$ mole based on 1 mole of the aromatic dihydroxy compound is desirable, because the rates of the ester interchange and polymerization reactions are increased and, the resulting polycarbonates are excellent in color tone, heat resistance and water resistance.

Furthermore, the use of the alkali metal or alkaline earth metal compound in an amount of $10^{-8}$–$10^{-3}$ based on 1 mole of the aromatic dihydroxy compound is desirable, because the polymerization activity, particularly the rate of polymerization is markedly increased and, the resulting polycarbonates are excellent in color tone, heat resistance and water resistance.

The catalyst used in the process according to the invention comprising a combination of the nitrogen containing basic compound (a) and alkali or alkaline earth metal compound (b), are found higher in polymerization activity.

They can form high molecular weight polycarbonates which are excellent in heat resistance and water resistance and improved in color tone and transparency.

A preferred catalyst which can be used herein comprises:
(a) a nitrogen containing basic compound,
(b) an alkali metal or alkaline earth metal compound, and
(c) boric acid or boric acid ester.

Useful nitrogen containing basic compound as component (a) of the catalyst and useful alkali metal or alkaline earth metal compound as component (b) of the catalyst are those as exemplified previously.

Useful boric acid or boric acid ester as component (c) of the catalyst includes boric acid and boric acid estes represented by the general formula B(OR)$_n$(OH)$_{3-n}$ (in the formula, R is alkyl such as methyl and ethyl, or aryl such as phenyl, and n is 1, 2 or 3).

Concretely, such boric acid ester as illustrated above includes trimethyl borate, triethyl borate, tributyl borate, trihexyl borate, triheptyl borate, triphenyl borate, tritolyl borate and trinaphthyl borate.

The preferred catalyst comprises from $10^{-6}$ to $10^{-1}$ mole, preferably from $10^{-5}$ to $10^{-2}$ mole, based on 1 mole of the aromatic dihydroxy compound, the nitrogen containing basic compound (a), from $10^{-8}$ to $10^{-3}$ mole, preferably from $10^{-7}$ to $10^{-4}$ mole, and more preferably from $10^{-7}$ to $10^{-5}$ mole, based on 1 mole of the aromatic dihydroxy compound, of the alkali metal or alkaline metal compound and from $10^{-8}$ to $10^{-1}$ mole, preferably from $10^{-7}$ to $10^{-2}$ mole, and more preferably from $10^{-6}$ to $10^{-4}$ mole, based on 1 mole of the aromatic dihydroxy compound, of the boric acid or boric acid ester (c).

The use of the nitrogen containing basic compound (a) and the alkali metal or alkaline earth metal compound (b) in amounts of from $10^{-6}$ to $10^{-1}$ mole and from $10^{-8}$ to $10^{-3}$ mole, respectively, based on 1 mole of the aromatic dihydroxy compound is desirable for the same reasons as noted above.

The use of boric acid or boric acid ester (c) in an amount of from $10^{-8}$ to $10^{-1}$ mole based on 1 mole of the aromatic dihydroxy compound is desirable, because the resulting polycarbonates are excellent in color tone, water resistance, and heat resistance and a decrease in the molecular weight of the polycarbonates, when heat aged, is restrained.

It has been found that the preferred catalyst comprising a combination of the nitrogen containing basic compound (a), alkali or alkaline earth metal compound (b) and boric acid or its ester (c), is much higher in polymerization activity and productive of higher molecular weight polycarbonates which are more excellent in heat resistance and water resistance and more improved in color tone and transparency, than with the catalyst comprising the nitrogen-containing basic compound (a) and the alkali metal or alkaline metal compound (b), and containing no boric acid or boric ester.

In the processes according to the invention the polycondensation reaction of the aromatic dihydroxy compound with carbonic diester or of the aromatic dihydroxy compound with diphenyl carbonate compound may be carried out under the same conditions known for the same reaction. Specifically, the first stage of the polycondensation are carried out under ambient pressure at a temperature of from 80° to 250° C., preferably from 100° to 230° C., more preferably from 120° to 190° C., for up to 5 hours, preferably up to 4 hours, more preferably from 0.25 to 3 hours. In the second stage, the reaction is continued while reducing the pressure and elevating the temperature, and completed eventually under a reduced pressure of 1 mmHg or lower amd at a temperature of from 240° to 320° C.

The polycondensation reaction as illustrated above may be carried out either continuously or batchwise. An apparatus in which the abovementioned reaction is carried out may be of a type of tank, tube or column.

The polycarbonates in accordance with the invention will now be described in detail.

A polycarbonate according to the invention is characterized in that from 10 to 30% of its terminal groups are hydroxy groups.

Further a polycarbonate according to the invention is characterized in that not more than 30%, preferably from 5 to 25%, more preferably from 10 to 20%, of its terminal groups are hydroxy groups and that it preferably has a sodium content of not more than 1 ppm, more preferably not more than 0.5 ppm and a chlorine content of not more than 20 ppm, more preferably not more than 10 ppm.

Such a polycarbonate is particularly excellent in color tone, heat resistance and water resistance. This is believed that while hydroxyl terminal groups of a polycarbonate provides reactive sites, the reduced chlorine and sodium contents prescribed herein suppress undesirable reaction of hydroxyl terminal groups thereby preventing the polycarbonate from being badly discolored.

In addition, in cases that the polycarbonate according to the invention contains not more than 1 ppm of a total content of alkali metal such as lithium, potassium and cesium and alkaline earth metal such as beryllium, magnesium and calcium, the polycarbonate is excellent in color tone, water resistance and heat resistance.

The polycarbonate according to the invention has an intrinsic viscosity $[\eta]$ of from 0.3 to 1.0 dl/g, as measured in methylene chloride at a temperature of 20° C.

The polycarbonate according to the invention is in no way restricted by processes for the production thereof. It can be produced, as illustrated hereinafter in some Examples, by the processes according to the invention in which conditions including the sodium and chlorine contents of the starting materials and the amount of the sequestering agent are suitably selected. Further, it will be produced by so-called interface processes, if conditions, in particular the sodium and chlorine content of the starting aromatic dihydroxy compound to be reacted with phosgen and the amount of a sequestering agent to be used are suitably selected.

EFFECT OF THE INVENTION

By the first, second and third processes according to the invention in which melt polycondensation of an aromatic dihydroxy compound with a carbonic acid diester or diphenyl carbonate compound in the presence of a specific amount of a selected sequestering agent using a specific catalyst, there can be produced polycarbonates having hydroxy terminal groups not exceeding 30%, preferably not exceeding 20%, more preferably from 10 to 20% based on the whole terminal groups thereof and an intrinsic viscosity $[\eta]$ of from 0.3 to 1.0 dl/g, as measured in methylene chloride at a temperature of 20° C. The polycarbonates obtainable by the first, second and third processes according to the invention are excellent in heat resistance and water resistance (resistance to hydrolysis). Moreover, they are excellent in color tone and tensile strength even after immersion in boiling water.

The polycarbonate according to the invention, which has specific amounts of hydroxy terminal groups endcapped and reduced chlorine and sodium contents, is excellent in color tone, heat resistance and water resistance (resistance to hydrolysis).

EXAMPLES

The invention will now be further described with reference to the following examples. It should be appreciated, however, that the invention is in no way limited by the examples.

Methods for measurement of physical properties employed are as follows.

Intrinsic viscosity (IV)

The intrinsic viscosity of a sample was measured at 20° C. on a solution of the sample in methylene chloride (0.5 g/dl) using a Ubbelohde's viscometer.

Hue (b value)

A press sheet of a sample having a thickness of 2 mm was measured for Lab values by the transmission method using Color and Color Difference Meter ND-1001 Dp, manufactured and sold by Nippon Denshoku Kogyo K. K., and the measured b value was used as a measure of yellowness.

Heat aging test (1)

Pellets of a sample were dried at 120° C. under 400 mmHg for 12 hours, and 4.5 g of the pellets thus dried was weighed on Petri dish made of Teflon having diameter of 40 mm and kept for 16 hours at 250° C. in a gear oven (GHPS-212 manufactured and sold by Tabai Seisakusho K. K., air replacement ratio 71.6 times/hr.), and then cooled to room temperature. The sample so treated was formed into a press sheet of a thickness of 2 mm, and measured for hue (b value) and IV.

Heat aging test (2)

A press sheet of a sample having a thickness of 3 mm was kept for 1,000 hours at 140° C. in a gear oven (GHPS-212 manufactured and sold by Tabai Seisakusho K. K., air replacement ratio 71.6 times/hr.), and then cooled to room temperature. Hue of the so heat aged press sheet was determined and the yellowness index was calculated in accordance with the following equation.

$$YI = (71.53 a - 178.82 b)/L$$
$$= (100/Y) \times (1.277 X - 1.060 Z)$$

Test for water resistance (1)

A dumbbell of 5 mm width×5 cm length was punched out from a press sheet of 0.5 mm thickness, immersed in boiling water, and withdrawn therefrom after the lapse of 1 day, 3 days and 7 days, respectively. Within 1 hour after the removal, the dumbbell thus treated was subjected to tensile test with Instron 1132 under the conditions a distance of 30 mm between zippers, a rate of pulling of 50 mm/min, and a range of measurement of 50 kg, thereby measuring a value of elongation (%).

Test for water resistance (2)

A press sheet of a sample having a thickness of 3 mm was immersed in water kept in an autoclave, which was held in an oven at a temperature of 125° C. for 5 days. The press sheet so treated was measured for a haze, by means of NDH-200 supplied by Nippon Denshoku Kogyo K. K.

Conditions for the preparation of press sheet

Press sheets were prepared as follows, unless otherwise specified. Pellets of a sample were dried for 12 hours at 120° C. under 400 mmHg, maintained for 10 minutes under nitrogen atmosphere. Thereafter, the pellets were pressed for 5 minutes at 280° C. and 100 kg/cm², and then pressed for 5 minutes at room temperature.

Terminal structure

Terminal OH groups and terminal structure were determined on a solution of 0.4 g of a sample in 3 ml of chloroform at a temperature of 40° C., using $^{13}$C-NMR (GX-270 supplied by NIPPON Electronic Industries K. K.). The concentration of terminal OH groups was expressed in % based on the content of the whole terminal groups.

Concentration of terminal OH groups

On a solution of 0.25 g of a sample in 10 ml of methylene chloride, the concentration of terminal OH groups was determined by measureing an absorption at OH reoups appearing in the proximity of 3580 cm$^{-1}$, using FT-IR (FT-IR 4300, supplied by SHIMAZU SEISAKUSHO K. K.), followed by calculation.

Sodium content

Sodium content of a polymer was determined on ashes from 20 g of the polymer with a critical value of 0.05 ppm, by atomic-absorption spectroscopy (using HITACHI 180-80, supplied by HITACHI SEISAKU-SHO K. K.).

Chlorine content

Fifty g of a polymer was gasified and dissolved in water in accordance with Schoniger's methos, and the chlorine content was determined with a critical value of 0.05 ppm by ion chromatography (using Ion chrophatograph 2000 i supplied by DIONEX K. K.).

EXAMPLE 1

A 100 ml glass reactor was charged with 47.08 g (0.220 mole) of diphenyl carbonate (having a sodium content of less than 0.05 ppm and a chlorine content of 24.0 ppm, supplied by Farbenfabriken BAYER A. G.), 45.600 g (0.200 mole) of Bisphenol A (having a sodium content of less than 0.05 ppm and a chlorine content of 16.4 ppm, supplied by G. E. Company), 2.12 g (0.01 mole, that is, 5 mol %/Bisphenol A) of p-cumylphenol

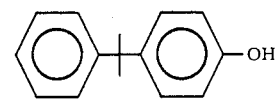

and 3.72 mg (3×10$^{-4}$ mole/mole of Bisphenol A) of boric acid H$_3$BO$_3$ (guaranteed reagent supplied by WAKO K. K.) under a nitrogen atmosphere, and the mixture was heated to a temperature of 180° C. and stirred with a stirrer made of Ni for a period of 30 minutes. At the end of the period there were added to the reactor 36.48 mg of a 15% aqueous solution of tetramethylammonium hydroxide Me$_4$NOH supplied by TOYO GOSEI K. K. (3×10$^{-4}$ mole of Me$_4$NOH/mole of Bisphenol A) and 0.50 mg (3×10$^{-4}$ mole/mole of Bisphenol A) of sodium hydrogencarbonate NaHCO$_3$ (guaranteed reagent by WAKO K. K.), and the mixture was for further 30 minutes at a temperature of 180° C. under a nitrogen atmosphere to effect the ester interchange reaction.

The reactor was then heated to a temperature of 210° C. and evacuated to a pressure of 200 mmHg. The reaction mixture was maintained under these conditions for 1 hour and then at 240° C. and 200 mmHg for 20 minutes. The pressure was slowly reduced to 150 mmHg, and the mixture was maintained at 240° C. for 20 minutes under this pressure, for further 20 minutes under 100 mmHg, and for 0.5 hour under 15 mmHg. Finally, the temperature was raised to 270° C. and the pressure was reduced to 0.5 mmHg, and the reaction was continued under these conditions for 2.0 hours.

Polycarbonate having an IV of 0.50 was obtained. The content of terminal OH groups of the product was 0%.

The results are shown in Table 1.

EXAMPLES 2 TO 4 AND COMPARATIVE EXAMPLES 1

Example 1 was repeated except that each of the sequestering agents indicated in Table 1 was used in an amount indicated in Table 1.

The results are shown in Table 1.

TABLE 1

| | Example 1 | Example 2 | Example 3 | Example 4 | Com. Ex. 1 |
|---|---|---|---|---|---|
| Sequestering agent | | | | | |
| Kind | P-cumylphenol | P-cumylphenol | P-cumylphenol | P-cumylphenol | P-cumylphenol |
| Amount (mol %/BPA) | 5.0 | 2.5 | 1.0 | 5.0 | 20 |
| Terminal groups and proportions | = 55/45/0 | = 58/39/3 | = 61/34/5 | = 60/37/3 | = 51/49/0 |
| Catalyst | | | | | |
| (a) component amount (2.5 × 10⁻⁴ mol/BPA) | (CH₃)₄NOH 1.200 | (CH₃)₄NOH 1.200 | (CH₃)₄NOH 1.200 | (CH₃)₄NOH 1.200 | (CH₃)₄NOH 1.200 |
| (b) component amount (2.5 × 10⁻⁴ mol/BPA) | NaHCO₃ 0.120 | NaHCO₃ 0.120 | NaHCO₃ 0.120 | NaHCO₃ 0.120 | NaHCO₃ 0.120 |
| (c) component amount (2.5 × 10⁻⁴ mol/BPA) | H₃BO₃ 1.200 | H₃BO₃ 1.200 | H₃BO₃ 1.200 | H₃BO₃ 1.200 | H₃BO₃ 1.200 |
| Physical properties | | | | | |
| Na content (ppm) | 3.14 | 3.06 | 3.20 | 3.04 | 3.22 |
| Cl content (ppm) | 17.65 | 18.77 | 19.23 | 15.32 | 14.64 |
| IV (dl/g) | 0.50 | 0.53 | 0.55 | 0.52 | 0.29 |
| Hue (b value) | 1.1 | 1.0 | 1.0 | 1.1 | 1.0 |
| Content of hydroxy terminal groups (%) | 0 | 3 | 5 | 3 | 0 |
| Heat resistance (1) (after 16 hours at 250° C.) | | | | | |
| IV (dl/g) | 0.46 | 0.48 | 0.50 | 0.46 | 0.29 |
| Hue (b value) | 19.2 | 21.6 | 23.5 | 21.4 | not moldable |
| Heat resistance (2) | | | | | |
| (initial) Hue (YI) | 2.77 | 2.54 | 2.53 | 2.67 | 2.45 |
| (after 1,000 hours at 140° C.) Hue (YI) | 12.33 | 11.78 | 12.55 | 13.24 | 15.76 |
| Water resistance (1) | | | | | |
| Elogation (%) (after immersion in boiling water for) | | | | | |
| 0 day | 92.5 | 96.3 | 101.5 | 93.2 | not moldable |
| 1 day | 53.2 | 53.2 | 62.5 | 54.1 | not moldable |
| 3 day | 31.5 | 33.4 | 34.7 | 36.2 | not moldable |
| 7 day | 20.3 | 21.3 | 25.8 | 23.4 | not moldable |
| water resistance (2) | | | | | |
| (initial) Haze | 0.9 | 0.8 | 0.8 | 0.8 | 0.7 |
| (after immersion in boiling water for 5 day) | | | | | |
| Haze | 89.5 | 91.3 | 90.6 | 90.2 | 93.4 |
| IV (dl/g) | 0.34 | 0.34 | 0.36 | 0.35 | 0.18 |
| retention of IV (%) | 68 | 65 | 66 | 67 | 63 |

EXAMPLE 5

A 100 ml glass reactor was charged with 45.368 g (0.212 mole) of diphenyl carbonate (same as used in Example 1), 45.600 g (0.200 mole) of Bisphenol A (same as used in Example 1), 3.280 g (0.01 mole, that is, 5 mol %/ Bisphenol A) of 2-carbomethoxy-5-tert.-butylphenyl phenyl carbonate

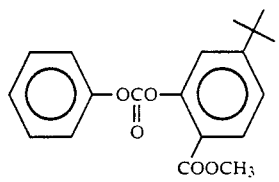

and 3.72 mg ($3 \times 10^{-4}$ mole/mole of Bisphenol A) of boric acid $H_3BO_3$ (guaranteed reagent supplied by WAKO K. K.) under a nitrogen atmosphere, and the mixture was heated to a temperature of 180° C. and stirred with a stirrer made of Ni for a period of 30 minutes. At the end of the period there were added to the reactor 36.48 mg of a 15% aqueous solution of tetramethylammoniun hydroxide $Me_4NOH$ supplied by TOYO GOSEI K. K. ($3 \times 10^{-4}$ mole of $Me_4NOH$/mole of Bisphenol A) and 0.50 mg ($3 \times 10^{-4}$ mole/mole of Bisphenol A) of sodium hydrogencarbonate $NaHCO_3$ (guaranteed reagent by WAKO K. K.), and the mixture was for further 30 minutes at a temperature of 180° C. under a nitrogen atmosphere to effect the ester interchange reaction.

The reactor was then heated to a temperature of 210° C. and evacuated to a pressure of 200 mmHg. The reaction mixture was maintained under these conditions for 1 hour and then at 240° C. and 200 mmHg for 20 minutes. The pressure was slowly reduced to 150 mmHg, and the mixture was maintained at 240° C. for 20 minutes under this pressure, for further 20 minutes under 100 mmHg, and for 0.5 hour under 15 mmHg. Finally, the temperature was raised to 270° C. and the pressure was reduced to 0.5 mmHg, and the reaction was continued under these conditions for 2.0 hours.

Polycarbonate having an IV of 0.51 was obtained. The content of terminal OH groups of the product was 1%.

The results are shown in Table 2.

EXAMPLES 6 TO 8 AND COMPARATIVE EXAMPLES 2

Example 5 was repeated except that each of the sequestering agents indicated in Table 2 was used in an amount indicated in Table 2.

The results are shown in Table 2.

EXAMPLE 9

Example 5 was repeated except that in place of the 2-carbomethoxy-5-tert.-butylphenyl phenyl carbonate, 0.01 mole (5 mol %/Bisphenol A) of diphenyl carbonate was additionally used.

The results are shown in Table 2.

TABLE 2

| | Example 5 | Example 6 | Example 7 | Example 8 | Example 9 | Com. Ex. 2 |
|---|---|---|---|---|---|---|
| Sequestering agent Kind | 2-carbomethoxy-5-t-butylphenyl phenyl carbonate 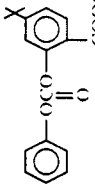 | 2-carbomethoxy-5-t-butylphenyl phenyl carbonate 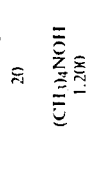 | 2-carbobutoxy-phenyl phenyl carbonate 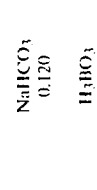 | p-cumylphenyl phenyl carbonate  | diphenyl carbonate 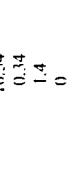 | 2-carbomethoxy-5-t-butylphenyl phenyl carbonate 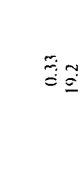 |
| Amount (mol %/BPA) | 5.0 | 2.5 | 2.5 | 2.5 | 5.0 | 20 |
| Catalyst | | | | | | |
| (a) component amount ($2.5 \times 10^{-4}$ mol/BPA) | $(CH_3)_4NOH$ 1.200 | $(CH_3)_4NOH$ 1.200 | $(CH_3)_4NOH$ 1.200 | $(CH_3)_4NOH$ 1.200 | $(CH_3)_4NOH$ 1.200 | $(CH_3)_4NOH$ 1.200 |
| (b) component amount ($2.5 \times 10^{-4}$ mol/BPA) | $NaHCO_3$ 0.120 | $NaHCO_3$ 0.120 | $NaHCO_3$ 0.120 | $NaHCO_3$ 0.120 | $NaHCO_3$ 0.120 | $NaHCO_3$ 0.120 |
| (c) component amount ($2.5 \times 10^{-4}$ mol/BPA) | $H_3BO_3$ 1.200 | $H_3BO_3$ 1.200 | $H_3BO_3$ 1.200 | $H_3BO_3$ 1.200 | $H_3BO_3$ 1.200 | $H_3BO_3$ 1.200 |
| Physical properties | | | | | | |
| Na content (ppm) | 3.16 | 3.22 | 3.06 | 3.35 | 3.11 | 3.14 |
| Cl content (ppm) | 13.45 | 12.67 | 14.38 | 15.48 | 13.28 | 16.54 |
| IV (dl/g) | 0.51 | 0.53 | 0.52 | 0.54 | 0.56 | 0.34 |
| Hue (b value) | 1.1 | 1.0 | 1.1 | 1.0 | 1.0 | 1.4 |
| Content of hydroxy terminal groups (%) | 1 | 3 | 1 | 5 | 2 | 0 |
| Heat resistance (1) (after 16 hours at 250° C.) | | | | | | |
| IV (dl/g) | 0.46 | 0.48 | 0.47 | 0.49 | 0.51 | 0.33 |
| Hue (b value) | 19.3 | 21.5 | 20.0 | 23.5 | 20.2 | 19.2 |
| Heat resistance (2) | | | | | | |
| (initial) Hue (YI) | 2.82 | 2.63 | 2.80 | 2.56 | 2.46 | 4.76 |
| (after 1,000 hours at 140° C.) Hue (YI) | 13.57 | 14.38 | 14.25 | 12.44 | 11.57 | 18.97 |
| Water resistance (1) (after immersion in boiling water for) | | | | | | |
| Elogation (%) | | | | | | |
| 0 day | 93.0 | 95.2 | 94.5 | 97.3 | 101.7 | 63.0 |
| 1 day | 64.5 | 57.3 | 51.4 | 62.5 | 61.4 | 3.4 |
| 3 day | 32.7 | 31.5 | 24.5 | 27.8 | 26.2 | 2.8 |
| 7 day | 21.5 | 23.2 | 21.2 | 24.2 | 22.6 | 2.1 |
| water resistance (2) (initial) Haze | 0.9 | 0.9 | 0.9 | 0.8 | 0.8 | 0.7 |
| (after immersion in boiling water for 5 day) | | | | | | |
| Haze | 90.1 | 91.4 | 91.6 | 89.4 | 88.4 | 93.0 |
| IV (dl/g) | 0.33 | 0.34 | 0.33 | 0.36 | 0.38 | 0.21 |
| retension of IV (%) | 64 | 64 | 63 | 67 | 67 | 61 |

EXAMPLE 10

A 500 ml glass reactor was charged with 141.24 g (0.660 mole) of diphenyl carbonate (having a sodium content of less than 0.05 ppm and a chlorine content of 15.0 ppm, obtained by washing diphenyl carbonate supplied by ENNY K. K., twice with hot water of pH 7 and 80° C. followed by distillation in a yield of 90%), 136.8 g (0.600 mole) of Bisphenol A (having a sodium content of less than 0.10 ppm and a chlorine content of 0.8 ppm, supplied by Japan G. E. Plastics Corporation), 6.36 g (0.03 mole, that is, 5 mol %/ Bisphenol A) of p-cumylphenol

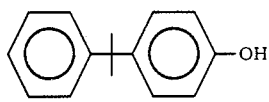

and 3.0 mg ($0.025 \times 10^{-4}$ mole/mole of Bisphenol A) of a 3% aqueous solution of boric acid $H_3BO_3$ under a nitrogen atmosphere, and the mixture was heated to a temperature of 180° C. and stirred with a stirrer made of Ni for a period of 30 minutes. At the end of the period there were added to the reactor 91.2 mg of a 15% aqueous solution of tetramethylammoniun hydroxide $Me_4$-NOH supplied by TOYO GOSEI K. K. ($2.5 \times 10^{-4}$ mole of $Me_4$NOH/mole of Bisphenol A) and 12.0 mg ($2.5 \times 10^{-4}$ mole/mole of Bisphenol A) of sodium hydroxide, and the mixture was for further 30 minutes at a temperature of 180° C. under a nitrogen atmosphere to effect the ester interchange reaction.

The reactor was then heated to a temperature of 210° C. and evacuated to a pressure of 200 mmHg. The reaction mixture was maintained under these conditions for 1 hour and then at 240° C. and 200 mmHg for 20 minutes. The pressure was slowly reduced to 150 mmHg, and the mixture was maintained at 240° C. for 20 minutes under this pressure, for further 20 minutes under 100 mmHg, and for 0.5 hour under 15 mmHg. Finally, the temperature was raised to 270° C. and the pressure was reduced to 0.5 mmHg, and the reaction was continued under these conditions for 2.0 hours.

Polycarbonate having an IV of 0.50 was obtained. The content of terminal OH groups of the product was 14%.

The results are shown in Table 3.

EXAMPLE 11

A 500 ml glass reactor was charged with 136.1 g (0.636 mole) of diphenyl carbonate (same as used in Example 10), 136.8 g (0.600 mole) of Bisphenol A (same as used in Example 10), 9.960 g (0.03 mole, that is, 5 mol %/ Bisphenol A) of p-cumylphenyl phenyl carbonate

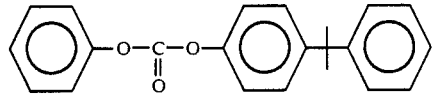

and 3.0 mg ($0.025 \times 10^{-4}$ mole/mole of Bisphenol A) of a 3% aqueous solution of boric acid $H_3BO_3$ under a nitrogen atmosphere, and the mixture was heated to a temperature of 180° C. and stirred with a stirrer made of Ni for a period of 30 minutes. At the end of the period there were added to the reactor 91.2 mg of a 15% aqueous solution of tetramethylammoniun hydroxide $Me_4$-NOH supplied by TOYO GOSEI K. K. ($2.5 \times 10^{-4}$ mole of $Me_4$NOH/mole of Bisphenol A) and 12.0 mg ($2.5 \times 10^{-4}$ mole/mole of Bisphenol A) of sodium hydroxide, and the mixture was for further 30 minutes at a temperature of 180° C. under a nitrogen atmosphere to effect the ester interchange reaction.

The reactor was then heated to a temperature of 210° C. and evacuated to a pressure of 200 mmHg. The reaction mixture was maintained under these conditions for 1 hour and then at 240° C. and 200 mmHg for 20 minutes. The pressure was slowly reduced to 150 mmHg, and the mixture was maintained at 240° C. for 20 minutes under this pressure, for further 20 minutes under 100 mmHg, and for 0.5 hour under 15 mmHg. Finally, the temperature was raised to 270° C. and the pressure was reduced to 0.5 mmHg, and the reaction was continued under these conditions for 2.0 hours.

Polycarbonate having an IV of 0.50 was obtained. The content of terminal OH groups of the product was 14%.

The results are shown in Table 3.

EXAMPLE 12

Example 11 was repeated except that in place of the p-cumylphenyl phenyl carbonate, diphenyl carbonate in an amount indicated in Table 3 was additionally used. Polycarbonate having an IV of 0.52 was obtained. The content of terminal OH groups of the product was 14%.

The results are shown in Table 3.

EXAMPLE 13

Example 10 was repeated except that the reaction at 270° C. under 0.5 mmHg was carried out for 2.2 hours. Polycarbonate having an IV of 0.52 was obtained. The content of terminal OH groups of the product was 7%.

The results are shown in Table 3.

EXAMPLE 14

Example 12 was repeated except that the reaction at 270° C. under 0.5 mmHg was carried out for 2.2 hours. Polycarbonate having an IV of 0.52 was obtained. The content of terminal OH groups of the product was 7%.

The results are shown in Table 3.

EXAMPLE 15

Example 10 was repeated except that the reaction at 270° C. under 0.5 mmHg was carried out for 2.5 hours. Polycarbonate having an IV of 0.53 was obtained. The content of terminal OH groups of the product was 2%.

The results are shown in Table 3.

EXAMPLE 16

Example 12 was repeated except that the reaction at 270° C. under 0.5 mmHg was carried out for 2.5 hours. Polycarbonate having an IV of 0.56 was obtained. The content of terminal OH groups of the product was 2%.

The results are shown in Table 3.

EXAMPLE 17

Example 12 was repeated except that the NaOH was used in an amount indicated in Table 3 and the reaction at 270° C. under 0.5 mmHg was carried out for 2.2 hours.

The results are shown in Table 3.

EXAMPLE 18

Example 12 was repeated except that the NaOH was used in an amount indicated in Table 3 and the reaction at 270° C. under 0.5 mmHg was carried out for 1.8 hours.

The results are shown in Table 3.

EXAMPLES 19 TO 22

Example 12 was repeated except that instead of the NaOH sodium compounds indicated in Table 3 was used in an amount indicated in Table 3.

The results are shown in Table 3.

COMPARATIVE EXAMPLE 3

Example 12 was repeated except that the catalyst was replaced as indicated in Table 3 and the reaction at 270° C., under 0.5 mmHg was carried out for 1 hour.

The results are shown in Table 3.

COMPARATIVE EXAMPLES 4 AND 5

Example 12 was repeated except that the diphenyl carbonate in amounts indicated in Table 3 was additionally used.

The results are shown in Table 3.

COMPARATIVE EXAMPLE 6

Properties of a polycarbonate prepared by an interface process from Bisphenol A and phosgene and supplied by G. E. Company (having an IV of 0.50 dl/g, a terminal hydroxyl content of 0%, a sodium content of less than 0.5 ppm and a chlorine content of 30 ppm) are shown in Table 3.

TABLE 3

| | Example 10 | Example 11 | Example 12 | Example 13 | Example 14 | Example 15 |
|---|---|---|---|---|---|---|
| Sequestering agent Kind | p-cumylphenol | p-cumylphenyl phenyl carbonate | diphenyl carbonate | p-cumylphenol | diphenyl carbonate | p-cumylphenol |
| Amount(mol %/BPA) | 5.0 | 5.0 | 6.0 | 5.0 | 6.0 | 5.0 |
| Catalyst | | | | | | |
| (a) component | $(CH_3)_4NOH$ | $(CH_3)_4NOH$ | $(CH_3)_4NOH$ | $(CH_3)_4NOH$ | $(CH_3)_4NOH$ | $(CH_3)_4NOH$ |
| amount($2.5 \times 10^{-4}$ mol/BPA) | 1.000 | 1.000 | 1.000 | 1.000 | 1.000 | 1.000 |
| (b) component | NaOH | NaOH | NaOH | NaOH | NaOH | NaOH |
| amount($2.5 \times 10^{-4}$ mol/BPA) | 0.002 | 0.002 | 0.002 | 0.002 | 0.002 | 0.002 |
| (c) component | $H_3BO_3$ | $H_3BO_3$ | $H_3BO_3$ | $H_3BO_3$ | $H_3BO_3$ | $H_3BO_3$ |
| amount($2.5 \times 10^{-4}$ mol/BPA) | 0.010 | 0.010 | 0.010 | 0.010 | 0.010 | 0.010 |
| Physical properties | | | | | | |
| Na content(ppm) | 0.17 | 0.19 | 0.16 | 0.17 | 0.19 | 0.18 |
| Cl content(ppm) | 6.01 | 6.03 | 5.93 | 6.08 | 6.12 | 6.02 |
| IV(dl/g) | 0.50 | 0.50 | 0.52 | 0.52 | 0.52 | 0.53 |
| Hue(b value) | 0.7 | 0.7 | 0.6 | 0.8 | 0.7 | 0.9 |
| Content of hydroxy terminal groups(%) | 14 | 14 | 14 | 7 | 7 | 2 |
| Heat resistance (1) (after 16 hours at 250° C.) | | | | | | |
| IV(dl/g) | 0.46 | 0.46 | 0.49 | 0.48 | 0.48 | 0.49 |
| Hue(b value) | 15.3 | 15.6 | 15.1 | 16.3 | 16.2 | 17.6 |
| Heat resistance (2) | | | | | | |
| (initial) Hue(YI) | 1.61 | 1.63 | 1.58 | 1.79 | 1.74 | 1.98 |
| (after 1,000 hours at 140° C.) Hue(YI) | 7.21 | 7.32 | 7.12 | 7.93 | 7.84 | 8.93 |
| Water resistance (1) Elogation(%) (after immersion in boiling water for) | | | | | | |
| 0 day | 101.1 | 101.3 | 103.5 | 103.2 | 105.7 | 103.4 |
| 1 day | 95.3 | 94.2 | 98.2 | 95.4 | 98.2 | 95.2 |
| 3 day | 85.6 | 85.1 | 89.7 | 83.5 | 87.4 | 82.7 |
| 7 day | 79.3 | 80.2 | 81.4 | 79.1 | 79.6 | 76.4 |
| water resistance (2) (initial) | | | | | | |
| Haze | 0.7 | 0.7 | 0.7 | 0.7 | 0.7 | 0.8 |
| Haze (after immersion in boiling water for 5 day) | 7.1 | 7.2 | 6.8 | 7.6 | 7.5 | 15.3 |
| IV(dl/g) | 0.44 | 0.44 | 0.46 | 0.46 | 0.46 | 0.47 |
| retension of IV (%) | 88 | 88 | 89 | 88 | 88 | 88 |
| Sequestering agent | Example 16 | Example 17 | Example 18 | Example 19 | Example 20 | Example 21 |

TABLE 3-continued

| Kind | Example 22 | Com. Ex. 3 | Com. Ex. 4 | Com. Ex. 5 | Com. Ex. 6 |
|---|---|---|---|---|---|
| | diphenyl carbonate | diphenyl carbonate | diphenyl carbonate | diphenyl carbonate | diphenyl carbonate |
| Amount(mol %/BPA) | 6.0 | 6.0 | 6.0 | 6.0 | 6.0 |
| Catalyst | | | | | |
| (a) component | (CH₃)₄NOH | (CH₃)₄NOH | (CH₃)₄NOH | (CH₃)₄NOH | (CH₃)₄NOH |
| amount(2.5 × 10⁻⁴ mol/BPA) | 1.000 | 1.000 | 1.000 | 1.000 | 1.000 |
| (b) component | NaOH | NaOH | C₁₇H₃₅COONa | ⌬—COONa | Na₂HPO₄ |
| amount(2.5 × 10⁻⁴ mol/BPA) | 0.002 | 0.001 | 0.002 | 0.002 | 0.001 |
| (c) component | H₃BO₃ | H₃BO₃ | H₃BO₃ | H₃BO₃ | H₃BO₃ |
| amount(2.5 × 10⁻⁴ mol/BPA) | 0.010 | 0.010 | 0.010 | 0.010 | 0.010 |
| Physical properties | | | | | |
| Na content(ppm) | 0.18 | 0.13 | 0.17 | 0.18 | 0.17 |
| Cl content(ppm) | 6.14 | 6.13 | 5.96 | 6.02 | 5.98 |
| IV(dl/g) | 0.56 | 0.51 | 0.52 | 0.52 | 0.52 |
| Hue(b value) | 0.9 | 0.6 | 0.7 | 0.6 | 0.6 |
| Content of hydroxy terminal groups(%) | 2 | 14 | 13 | 14 | 14 |
| Heat resistance (1) | | | | | |
| (after 16 hours at 250° C.) | | | | | |
| IV(dl/g) | 0.51 | 0.47 | | 0.49 | 0.49 |
| Hue(b value) | 16.1 | 15.0 | 15.7 | 15.1 | 15.3 |
| Heat resistance (2) | | | | | |
| (initial) | | | | | |
| Hue(YI) | 1.93 | 1.53 | 1.65 | 1.59 | 1.57 |
| (after 1,000 hours at 140° C.) | | | | | |
| Hue(YI) | 8.83 | 7.17 | 7.26 | 7.11 | 7.02 |
| Water resistance (1) | | | | | |
| Elogation (%) | | | | | |
| (after immersion in boiling water for) | | | | | |
| 0 day | 107.6 | 101.6 | 103.5 | 99.4 | 101.2 |
| 1 day | 96.2 | 98.5 | 93.4 | 95.2 | 97.3 |
| 3 day | 83.1 | 89.2 | 82.7 | 89.3 | 88.4 |
| 7 day | 77.3 | 81.5 | 78.9 | 80.1 | 81.2 |
| Water resistance (2) | | | | | |
| (initial) | | | | | |
| Haze | 0.8 | 0.7 | 0.7 | 0.7 | 0.7 |
| (after immersion in boiling water for 5 day) | | | | | |
| Haze | 13.2 | 6.4 | 6.9 | 6.5 | 6.7 |
| IV(dl/g) | 0.49 | 0.46 | 0.42 | 0.46 | 0.46 |
| retention of IV (%) | 88 | 91 | 83 | 89 | 89 |
| Sequestering agent | | | | | |
| Kind | diphenyl | diphenyl | diphenyl | diphenyl | polycarbonate |

TABLE 3-continued

| | carbonate Ph-OCO-O-Ph 6.0 | carbonate Ph-OCO-O-Ph 6.0 | carbonate Ph-OCO-O-Ph 1.0 | carbonate Ph-OCO-O-Ph 1.0 | prepared by interface process |
|---|---|---|---|---|---|
| Amount(mol %/BPA) | | | | | |
| Catalyst | | | | | |
| (a) component | (CH₃)₄NOH | — | (CH₃)₄NOH | (CH₃)₄NOH | — |
| amount(2.5 × 10⁻⁴ mol/BPA) | 1.000 | — | 1.000 | 1.000 | — |
| (b) component | NaO-Ph-C(CH₃)₂-Ph-ONa | NaOH | NaOH | NaOH | — |
| amount(2.5 × 10⁻⁴ mol/BPA) | 0.001 | 4.000 | 0.002 | 0.004 | — |
| (c) component | H₃BO₃ | — | H₃BO₃ | H₃BO₃ | — |
| amount(2.5 × 10⁻⁴ mol/BPA) | 0.010 | — | 0.010 | 0.010 | — |
| Physical properties | | | | | |
| Na content(ppm) | 0.16 | 101.56 | 0.18 | 0.17 | <0.05 |
| Cl content(ppm) | 5.84 | 6.43 | 6.32 | 6.40 | 30.21 |
| IV(dl/g) | 0.53 | 0.55 | 0.55 | 0.56 | 0.50 |
| Hue(b value) | 0.6 | 2.3 | 0.7 | 0.7 | 0.7 |
| Content of hydroxy terminal groups(%) | 12 | 0 | 45 | 81 | 0 |
| Heat resistance (1) | | | | | |
| (after 16 hours at 250° C.) | | | | | |
| IV(dl/g) | 0.50 | 0.31 | 0.51 | 0.52 | 0.45 |
| Hue(b value) | 15.3 | 22.4 | 19.7 | 21.3 | 17.8 |
| Heat resistance (2) | | | | | |
| (initial) | | | | | |
| Hue(YI) | 1.58 | 4.51 | 1.69 | 1.68 | 1.65 |
| (after 1,000 hours at 140° C.) | | | | | |
| Hue(YI) | 7.14 | 17.89 | 35.96 | 52.78 | 8.36 |
| Water resistance (1) | | | | | |
| Elogation (%) | | | | | |
| (after immersion in boiling water for) | | | | | |
| 0 day | 101.6 | 101.2 | 103.4 | 102.6 | 105.4 |
| 1 day | 95.4 | 1.6 | 95.2 | 96.3 | 72.1 |
| 3 day | 85.2 | 1.4 | 83.1 | 85.2 | 58.6 |
| 7 day | 80.7 | 0.9 | 75.4 | 76.4 | 42.7 |
| water resistance (2) | | | | | |
| (initial) | | | | | |
| Haze | 0.7 | 1.5 | 0.7 | 0.7 | 0.7 |
| (after immersion in boiling water for 5 day) | | | | | |
| Haze | 6.3 | 98.2 | 7.2 | 7.1 | 18.2 |
| IV(dl/g) | 0.48 | 0.25 | 0.48 | 0.49 | 0.45 |
| retention of IV (%) | 90 | 45 | 88 | 88 | 90 |

EXAMPLES 23-25

Example 12 was repeated except that instead of the NaOH compounds indicated in Table 4 was used in an amount indicated in Table 4.

The results are shown in Table 4.

TABLE 4

| | Example 23 | Example 24 | Example 25 |
|---|---|---|---|
| Sequestering agent | | | |
| Kind | diphenyl carbonate | diphenyl carbonate | diphenyl carbonate |
| | Ph-O-CO-O-Ph | Ph-O-CO-O-Ph | Ph-O-CO-O-Ph |
| Amount(mol %/BPA) | 6.0 | 6.0 | 6.0 |
| Catalyst | | | |
| (a) component | $(CH_3)_4NOH$ | $(CH_3)_4NOH$ | $(CH_3)_4NOH$ |
| amount($2.5 \times 10^{-4}$ mol/BPA) | 1.000 | 1.000 | 1.000 |
| (b) component | LiOH | $C_{17}H_{35}COOLi$ | $K_2HPO_4$ |
| amount($2.5 \times 10^{-4}$ mol/BPA) | 0.002 | 0.002 | 0.001 |
| (c) component | $H_3BO_3$ | $H_3BO_3$ | $H_3BO_3$ |
| amount($2.5 \times 10^{-4}$ mol/BPA) | 0.010 | 0.010 | 0.010 |
| Physical properties | | | |
| Na content(ppm) | 0.11(Li < 0.05 ppm) | 0.10(Li < 0.05 ppm) | 0.12(K 0.08 ppm) |
| Cl content(ppm) | 5.93 | 5.96 | 6.03 |
| IV(dl/g) | 0.53 | 0.52 | 0.52 |
| Hue(b value) | 0.6 | 0.6 | 0.6 |
| Content of hydroxy terminal groups(%) | 14 | 13 | 12 |
| Heat resistance (1) | | | |
| (after 16 hours at 250° C.) | | | |
| IV(dl/g) | 0.50 | 0.49 | 0.49 |
| Hue(b value) | 15.0 | 15.1 | 15.4 |
| Heat resistance (2) | | | |
| (initial) | | | |
| Hue(YI) | 1.57 | 1.59 | 1.62 |
| (after 1,000 hours at 140° C.) | | | |
| Hue(YI) | 7.08 | 7.15 | 7.26 |
| Water resistance (1) | | | |
| Elogation (%) | | | |
| (after immersion in boiling water for) | | | |
| 0 day | 103.4 | 105.2 | 102.8 |
| 1 day | 96.7 | 94.2 | 97.3 |
| 3 day | 83.2 | 83.6 | 85.4 |
| 7 day | 79.3 | 79.1 | 80.7 |
| water resistance (2) | | | |
| (initial) | | | |
| Haze | 0.7 | 0.7 | 0.7 |
| (after immersion in boiling water for 5 day) | | | |
| Haze | 6.9 | 6.8 | 6.1 |
| IV(dl/g) | 0.46 | 0.45 | 0.47 |
| retension of IV (%) | 87 | 87 | 90 |

What is claimed is:

1. A process for the production of polycarbonates comprising melt polycondensing an aromatic dihydroxy compound and a carbonic acid diaromatic ester having from 13 to 16 carbon atoms in the presence of (1) from 0.05 to 15 mol %, based on 1 mole of the aromatic dihydroxy compound, of a monohydric phenol having from about 10 to 40 carbon atoms and (2) a catalyst comprising
   (a) a nitrogen containing basic compound, and
   (b) from $10^{-8}$ to $10^{-3}$ mole, based on 1 mole of the aromatic dihydroxy compound, of an alkali metal or alkaline earth metal compound, with or without,
   (c) boric acid or boric acid ester,
   thereby producing a polycarbonate having hydroxy terminal groups not exceeding 30% of the whole terminal groups thereof and an intrinsic viscosity ($\eta$) of from 0.3 to 1.0 dl/g. as measured in methylene chloride at a temperature of 20° C.

2. The process according to claim 1 wherein the boric acid or boric ester is present.

3. The process according to claim 1 wherein said phenol has from about 10 to 25 carbon atoms.

4. The process according to claim 2 wherein said phenol has from about 10 to 25 carbon atoms.

5. The process according to claim 1 wherein said phenol is a binuclear phenol.

6. The process according to claim 2 wherein said phenol is a binuclear phenol.

7. The process according to claim 1 wherein said phenol is p-cumylphenol.

8. The process according to claim 2 wherein said phenol is p-cumylphenol.

9. The process of claim 1 wherein the compound is a phenol of about 10 to 40 carbon atoms.

10. The process according to claim 1 wherein not more than 30% of the whole terminal groups of the produced polycarbonate are hydroxy groups and the polycarbonate has a sodium content of not more than 0.5 ppm and a chlorine content of not more than 10 ppm.

11. The process according to claim 1 wherein from 5 to 25% of the whole terminal groups of the produced polycarbonate are hydroxy groups and the polycarbonate has a sodium content of not more than 0.5 ppm and a chlorine content of not more than 10 ppm.

12. The process according to claim 2 wherein not more than 30% of the whole terminal groups of the produced polycarbonate are hydroxy groups and the polycarbonate has a sodium content of not more than 0.5 ppm and a chlorine content of not more than 10 ppm.

13. The process according to claim 2 wherein from 5 to 25% of the whole terminal groups of the produced polycarbonate are hydroxy groups and the polycarbonate has a sodium content of not more than 0.5 ppm and a chlorine content of not more than 10 ppm.

14. The process according to claim 9 wherein not more than 30% of the whole terminal groups of the produced polycarbonate are hydroxy groups and the polycarbonate has a sodium content of not more than 0.5 ppm and a chlorine content of not more than 10 ppm.

15. The process according to claim 9 wherein from 5 to 25% of the whole terminal groups of the produced polycarbonate are hydroxy groups and the polycarbonate has a sodium content of not more than 0.5 ppm and a chlorine content of not more than 10 ppm.

16. The process of claim 1 wherein the carbonic acid diaromatic ester having from 13 to 16 carbon atoms is diphenyl carbonate, ditolyl carbonate or m-cresyl carbonate.

17. The process of claim 1 wherein the carbonic acid diaromatic ester having from 13 to 16 carbon atoms is diphenyl carbonate.

18. A process for the production of polycarbonates comprising melt polycondensing an aromatic dihydroxy compound and a carbonic acid diaromatic ester having from 13 to 16 carbon atoms in the presence of (1) from 0.5 to 15 mole %, based on 1 mole of the aromatic dihydroxy compound, of a carbonic acid diester having 17 to 50 carbon atoms and (2) a catalyst comprising
   (a) a nitrogen containing basic compound, and
   (b) from $10^{-8}$ to $10^{-3}$ mole, based on 1 mole of the aromatic dihydroxy compound, of an alkali metal or alkaline earth metal compound, and, with or without
   (c) boric acid or boric acid ester, thereby producing a polycarbonate wherein no more than 30% of the total polycarbonate terminal groups are hydroxyl groups and the intrinsic viscosity ($\eta$) of the polycarbonate is in the range of from 0.3 to 1.0 dl/g, as measured in methylene chloride at a temperature of 20° C.

19. The process of claim 18 wherein the carbonic acid diester having from 17 to 50 carbon atoms is a compound represented by the following formula (I)

wherein
   A is an organic group having from 6 to 25 carbon atoms, and
   B is an organic group having from 10 to 25 carbon atoms with the provision that the total number of carbon atoms in the molecule does not exceed 50.

20. The process of claim 18 wherein the carbonic acid diester having from 17 to 50 carbon atoms is cumylphenyl phenyl carbonate or dicumylphenyl carbonate.

21. The process of claim 18 wherein the boric acid or boric ester is present.

* * * * *